(12) United States Patent
Hirai

(10) Patent No.: US 11,284,002 B2
(45) Date of Patent: Mar. 22, 2022

(54) IMAGE PICKUP APPARATUS, ITS CONTROL METHOD, AND STORAGE MEDIUM

(71) Applicant: CANON KABUSHIKI KAISHA, Tokyo (JP)

(72) Inventor: Daisuke Hirai, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/021,592

(22) Filed: Sep. 15, 2020

(65) Prior Publication Data

US 2021/0105408 A1    Apr. 8, 2021

(30) Foreign Application Priority Data

Oct. 4, 2019 (JP) .............................. JP2019-183749

(51) Int. Cl.
*H04N 5/232* (2006.01)

(52) U.S. Cl.
CPC ................................ *H04N 5/23287* (2013.01)

(58) Field of Classification Search
CPC .. H04N 5/23254; H04N 5/23248–2329; G06T 7/38; G03B 2205/0007–0038
USPC .................. 348/208.1; 396/54; 359/554–557
See application file for complete search history.

(56) References Cited

U.S. PATENT DOCUMENTS

| 9,876,958 B2 | 1/2018 | Sakurai |
| 2019/0020822 A1* | 1/2019 | Sharma .............. H02K 41/0356 |

FOREIGN PATENT DOCUMENTS

| JP | 2009265182 A | 11/2009 |
| JP | 2015194712 A | 11/2015 |
| JP | 2017017585 A | 1/2017 |

\* cited by examiner

*Primary Examiner* — Xi Wang
(74) *Attorney, Agent, or Firm* — Rossi, Kimms & McDowell LLP

(57) ABSTRACT

An image pickup apparatus includes a controller. The controller controls a mover so as to move, when an optical element in the imaging optical system moves, an image sensor for the image stabilization in each of a first imaging period and a next second imaging period. The controller selects and performs one of a first image stabilization control and a second image stabilization control after the first imaging period ends, the first image stabilization control controlling the mover so as to return the image sensor to a predetermined initial position and to move the image sensor from the predetermined initial position during the second imaging period, and the second image stabilization control controlling the mover so as to hold the image sensor at a position at an end of the first imaging period and to move the image sensor from the position at the end.

8 Claims, 5 Drawing Sheets

IMAGE PICKUP APPARATUS, ITS CONTROL METHOD, AND STORAGE MEDIUM

BACKGROUND OF THE INVENTION

Field of the Invention

The present invention relates to an image pickup apparatus having an image stabilizing (image blur correcting) function.

Description of the Related Art

Some image pickup apparatuses move, when an image stabilizing lens in an imaging optical system moves, an image sensor for the image stabilization, and provide an image stabilizing performance higher than that of the image pickup apparatus that moves only the image stabilizing lens. Japanese Patent Laid-Open No. ("JP") 2009-265182 discloses an image pickup apparatus configured to move only the image stabilizing lens in the interchangeable lens without moving the image sensor before starting capturing a still image, and moves both the image stabilizing lens and the image sensor during the imaging period. A correction amount of the image sensor at the start of exposure is determined by a correction amount of the image stabilizing lens at the start of imaging, and discontinuous operations are prevented when driving the image sensor is started before the start of exposure. JP 2015-194712 discloses an image pickup apparatus that moves the image sensor after moving the image stabilizing lens to the center (initial position) in its movable range when imaging starts.

However, a start of next imaging delays when images are repetitively captured such as continuous imaging, and preliminary driving is made to move the position of the image sensor before the imaging starts or the image sensor is moved to the initial position after a single imaging period ends.

SUMMARY OF THE INVENTION

The present invention provides an image pickup apparatus, its control method, and a storage medium, each of which can provide a good image stabilizing performance even with a short time interval between image captures when images are repetitively captured.

An image pickup apparatus includes an image sensor configured to capture an object image formed by an imaging optical system, a mover configured to move the image sensor for an image stabilization, and a controller configured to control the mover. The controller controls the mover so as to move, when an optical element in the imaging optical system moves, the image sensor for the image stabilization in each of a first imaging period and a next second imaging period. The controller selects and performs one of a first image stabilization control and a second image stabilization control after the first imaging period ends, the first image stabilization control controlling the mover so as to return the image sensor to a predetermined initial position and to move the image sensor from the predetermined initial position during the second imaging period, and the second image stabilization control controlling the mover so as to hold the image sensor at a position at an end of the first imaging period and to move the image sensor from the position at the end. A control method of the above image pickup apparatus and a non-transitory computer-readable storage medium storing a computer program that causes a computer to execute the control method also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
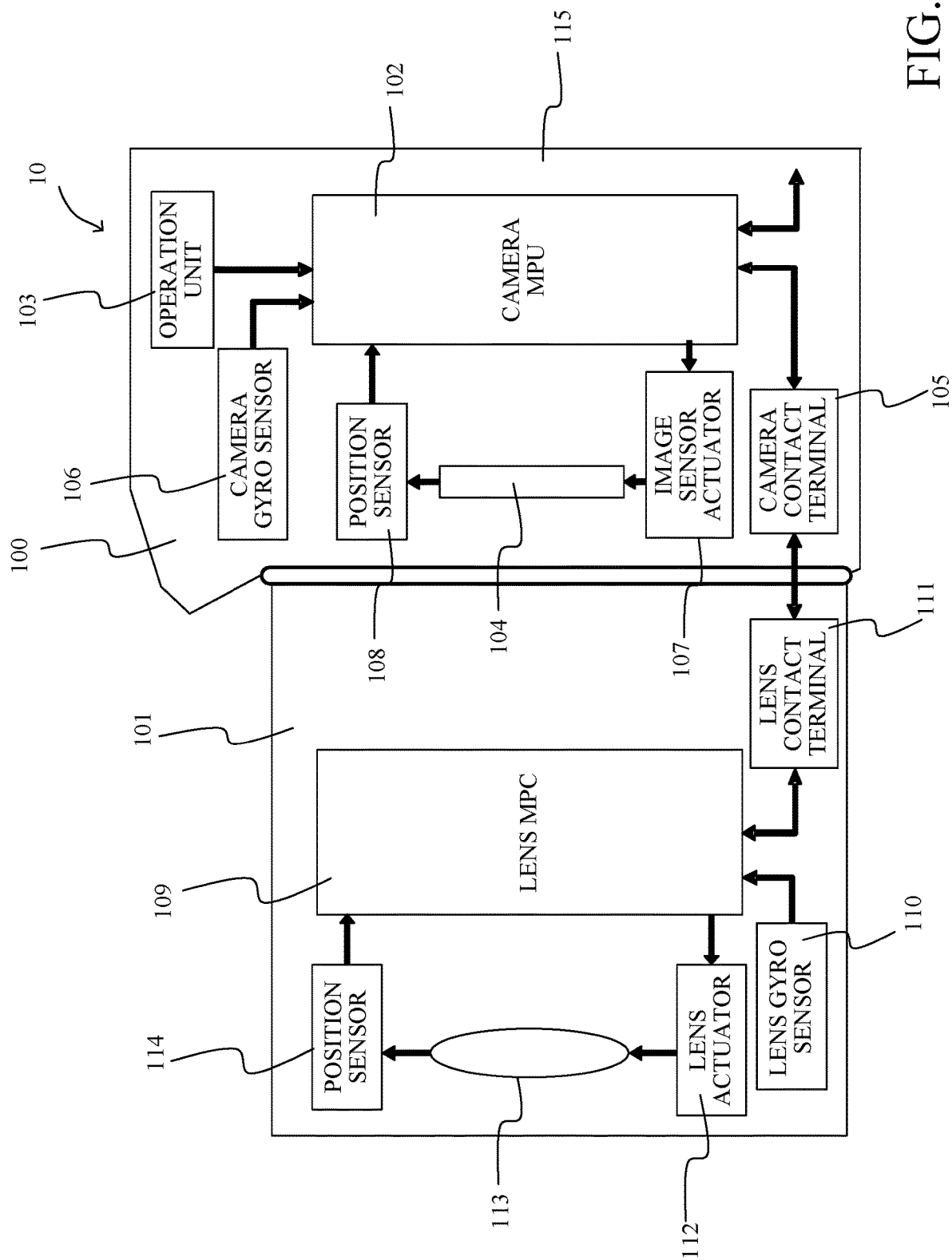
FIG. 1 is a block diagram illustrating a configuration of a camera system according to a first embodiment of the present invention.

FIG. 1 illustrates a configuration of a camera system 10 according to a first embodiment of the present invention. The camera system 10 includes an interchangeable lens 101, and a camera body 100 to which the interchangeable lens 101 is detachably and communicably connected. The camera body 100 includes a camera MPU 102, an operation unit 103, an image sensor 104, a camera contact terminal 105, a camera gyro sensor 106, and a rear display unit 115.

The camera MPU 102 serving as a controller that governs the entire controls of the camera body 100 and the interchangeable lens 101, which include various operations such as AE (auto-exposure), AF (autofocus), and imaging, in accordance with inputs from the operation unit 103, which will be described later. "Imaging or image capturing" in this embodiment means capturing a still image for recording. The camera MPU 102 also controls IIS described below.

The camera MPU 102 communicates various commands and information with a lens MPU 109 through a camera contact terminal 105 and a lens contact terminal 111 provided to the interchangeable lens 101. The camera contact terminal 105 and the lens contact terminal 111 also include a power supply terminal used to supply the power from the camera body 100 to the interchangeable lens 101.

The operation unit 103 has a mode dial for setting various imaging modes, a release button for instructing a start of an imaging preparation operation including the AE and the AF, and a still imaging operation (simply referred to as an imaging operation hereinafter). A first switch is turned on (SW1ON) by half-pressing the release button, and a second switch (SW2) is turned on by fully pressing the release button. The imaging preparation operation is performed when SW1 is turned on, the start of the imaging operation is instructed when SW2 is turned on (SW2-1ON), and an actual exposure by the image sensor 104 is started a predetermined time after the instruction (SW2-2ON). SW2-1ON and SW2-2ON are turned off when the set exposure time (imaging period) elapses and the image capturing ends. SW1ON, SW2-1ON, and SW2-2ON are notified from the camera MPU 102 to the lens MPU 109 by communications.

The image sensor 104 has a photoelectric conversion element, such as a CCD sensor or a CMOS sensor, and photoelectrically converts (captures) an object image formed by an imaging optical system described later to generate an imaging signal. The camera MPU 102 uses the imaging signal from the image sensor 104, and generates a live-view image and a still image for recording.

The camera gyro sensor 106 is a shake sensor that detects an angular shake (camera shake) of the camera body 100 due to camera shakes or the like, and outputs a camera shake detection signal as an angular velocity signal. The camera MPU 102 drives an image sensor actuator 107 as a mover based on the camera shake detection signal and an IIS correction ratio described later, and moves the image sensor 104 in a direction orthogonal to an optical axis of the imaging optical system described later. At this time, the camera MPU 102 provides a feedback control of the image sensor actuator 107 so that the position of the image sensor 104 detected by an image sensor position sensor 108 or the position of the image sensor 104 moved from the position on the optical axis as the center position (predetermined initial position) in the movable range of the image sensor 104 can approach to the target position. Thereby, the image stabilization (referred to as IIS hereinafter) reduces (corrects) image blurs through movements of the image sensor 104. The IIS is made for camera shakes in the vertical direction (pitch direction) and in the horizontal direction (yaw direction).

The rear display unit 115 as a display unit displays a live-view image generated by the camera MPU 102 using the imaging signal from the image sensor 104 before image capturing. The user can observe the displayed live-view image as a viewfinder image. The rear display unit 115 can display the still image for recording generated by the image capturing or recorded in the recording medium after the image capturing.

The interchangeable lens 101 has the unillustrated imaging optical system, the lens MPU 109 and the lens contact terminal 111 described above, and a lens gyro sensor 110. The lens gyro sensor 110 is a shake sensor that detects an angular shake (lens shake) of the interchangeable lens 101 and outputs a lens shake detection signal as an angular velocity signal.

The lens MPU 109 drives the lens actuator 112 based on the lens shake detection signal and an OIS correction ratio described later, and moves the image stabilizing lens 113 that serves an optical element in the imaging optical system in the direction orthogonal to the optical axis of the imaging optical system. At this time, the lens MPU 109 performs a feedback control for the lens actuator 112 so that the position of the image stabilizing lens 113 detected by the lens position sensor 114 or the position moved from the position on the optical axis, which is the center position in the movable range of the image stabilizing lens 113 can approach to the target position. Thereby, the image stabilization (referred to as OIS hereinafter) corrects image blurs through movements of the image stabilizing lens 113.

The OIS is also performed for lens shakes in the pitch direction and in the yaw direction, similar to the IIS.

Figure 2:
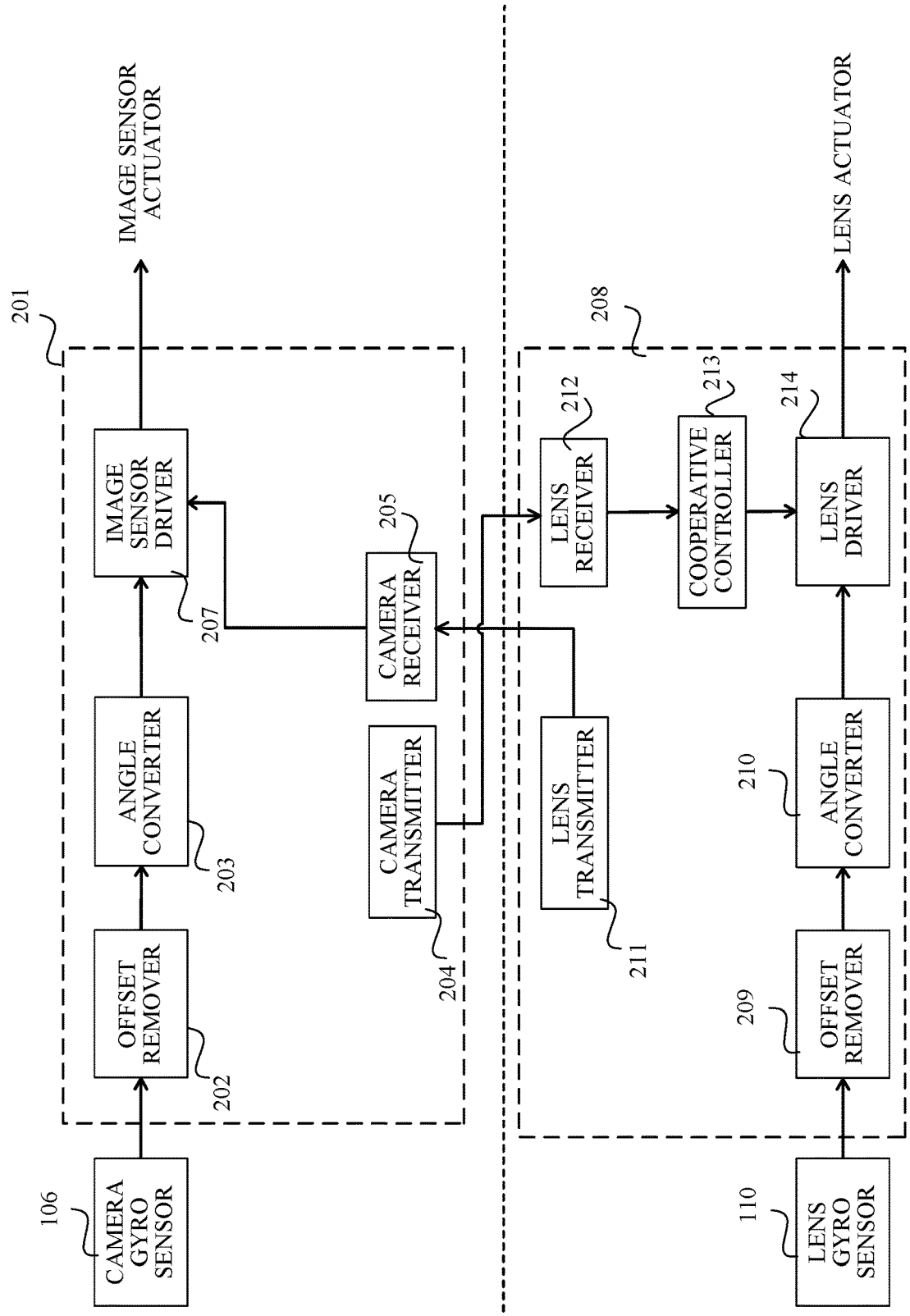
FIG. 2 is a block diagram illustrating a configuration of an image stabilizer according to the first embodiment.

FIG. 2 illustrates a configuration of an image stabilizer in the camera system 10. The image stabilizer includes a camera image stabilizer 201 provided to the camera body 100 and a lens image stabilizer 208 provided to the interchangeable lens 101. The camera image stabilizer 201 is included in the camera MPU 102, and the lens image stabilizer 208 is included in the lens MPU 109.

An offset remover 202 in the camera image stabilizer 201 removes an offset component from the camera shake detection signal output from the camera gyro sensor 106. An angle converter 203 converts an angular velocity signal as the camera shake detection signal output from the offset remover 202 into an angle signal.

A camera receiver 205 receives the IIS correction ratio transmitted from a lens transmitter 211 in the lens MPU 109. An image sensor driver 207 generates a driving signal for moving the image sensor 104 in accordance with the angle signal output from the angle converter 203 and the IIS correction ratio received from the lens MPU 109.

This embodiment performs the OIS without performing the IIS (or without moving the image sensor 104) before the imaging period. Then, during the imaging period, this embodiment performs the cooperative image stabilizations using the IIS and OIS in accordance with the IIS correction ratio and the OIS correction ratio.

The offset remover 209 in the lens image stabilizer 208 removes the offset component from the lens shake detection signal output from the lens gyro sensor 110. The angle converter 210 converts the angular velocity signal as the lens shake detection signal output from the offset remover 209 into an angle signal. A lens receiver 212 receives information on the image stabilization transmitted from the camera transmitter 204 (a movable stroke amount of the image sensor 104, which will be described later). A cooperation controller 213 determines the OIS correction ratio and the IIS correction ratio using internal information of the lens MPU 109 (such as the OIS image stabilization sensitivity that changes depending on zooming and focusing in the imaging optical system) and the information on the image stabilization received by the lens receiver 212. The OIS correction ratio indicates a ratio of the OIS correction amount that is an image stabilization amount due to the movement of the image stabilizing lens 113 to the total image stabilization amount due to both the OIS and the IIS. The IIS correction ratio indicates a ratio of the IIS correction amount that is the image stabilization amount due to the movement of the image sensor 104 to the total image stabilization amount. The lens driver 214 generates a driving signal for moving the image stabilizing lens 113 in accordance with the angle signal output from the angle converter 210 and the OIS correction ratio determined by the cooperation controller 213. The lens MPU 109 sends the IIS correction ratio to the camera MPU 102.

A cooperation controller corresponding to the cooperative controller 213 may be provided to the camera image stabilizer 201, and the OIS correction ratio determined by the cooperation controller may be transmitted to the lens MPU 109.

Figure 3A:
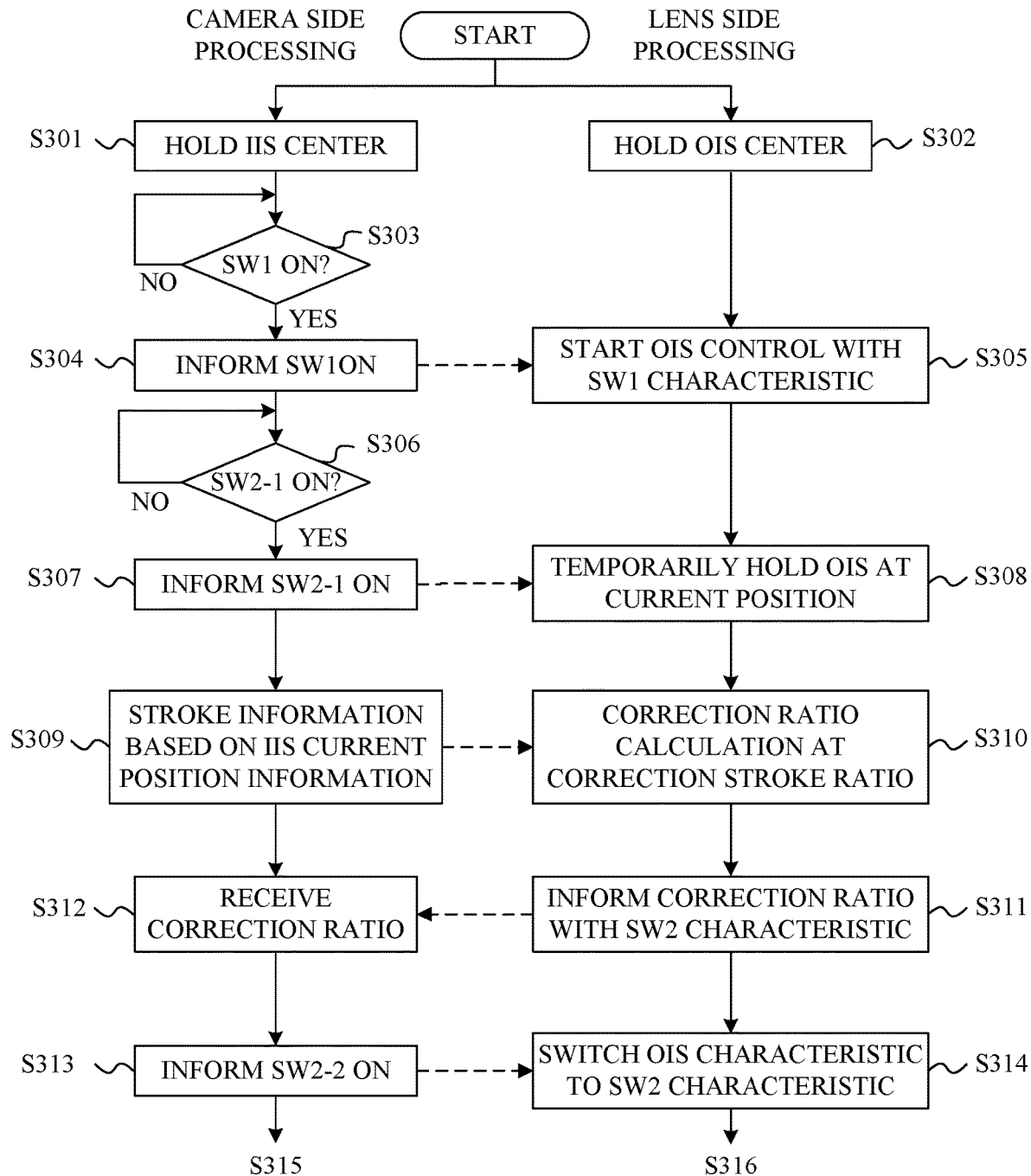
FIGS. 3A and 3B are a flowchart showing image stabilizing processing according to the first embodiment.
Figure 3B:
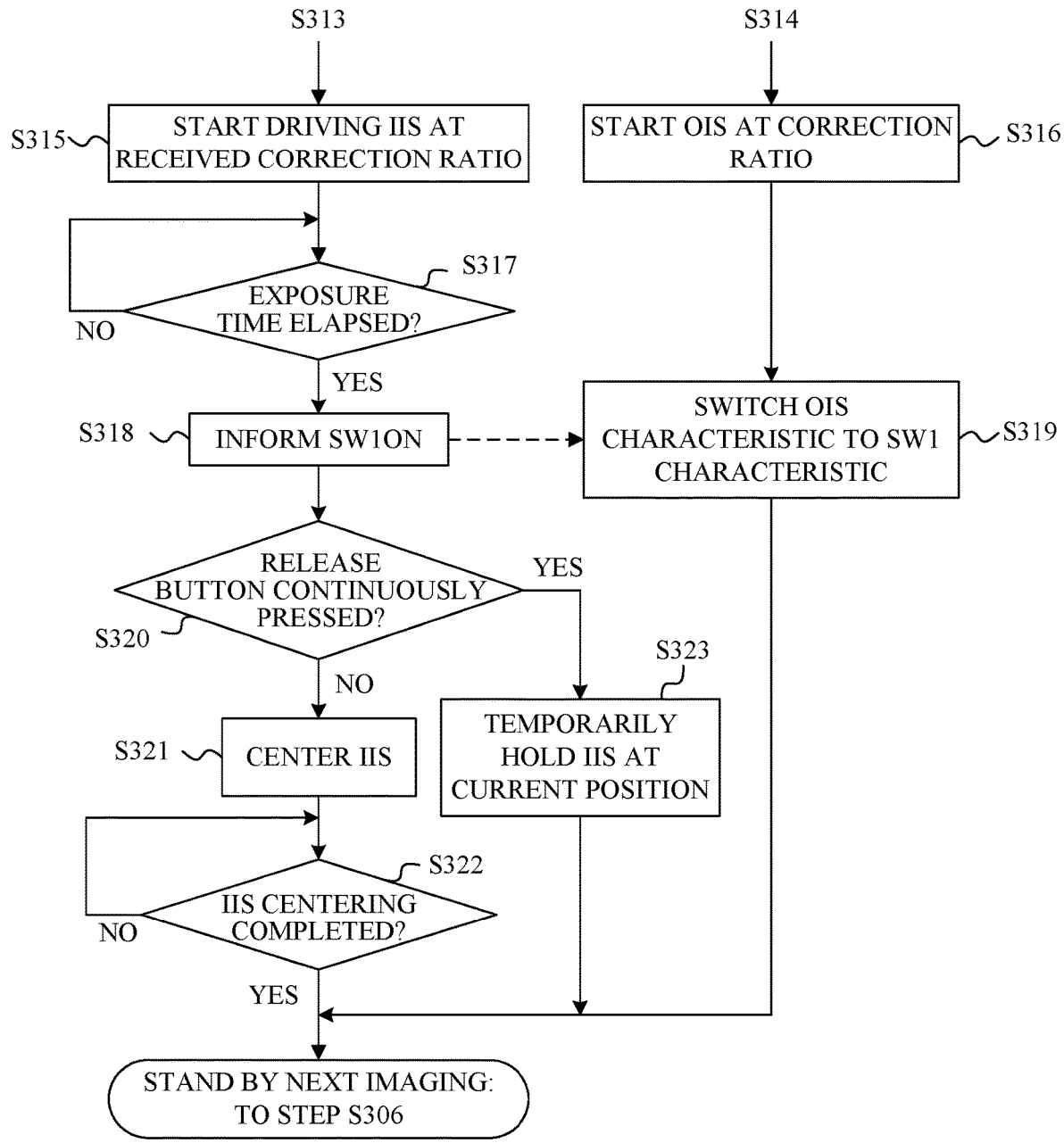

A flowchart in FIGS. 3A and 3B shows image stabilizing processing (control method) executed by the camera MPU 102 (camera image stabilizer 201) and the lens MPU 109 (lens image stabilizer 208), each of which includes a computer, according to a computer program. The left side of the figure shows camera side processing executed by the camera MPU 102, and the right side shows lens side processing executed by the lens MPU 109.

When the camera body 100 is powered on and the interchangeable lens 101 is supplied with the power, the camera MPU 102 and the lens MPU 109 start communicating with each other and the image stabilization processing starts. First, in the step S301, the camera MPU 102 holds the image sensor 104 at the center position (initial position) in its movable range. Similarly, in the step S302, the lens MPU 109 holds the image stabilizing lens 113 at the center position in its movable range.

Next, in the step S303, the camera MPU 102 waits until the user half-presses the release button to turn on SW1, and when SW1 turns on, the flow proceeds to step S304 to notify the lens MPU 109 of SW1 ON. The lens MPU 109 that has received the notice of SW1ON in the step S305 starts controlling the OIS with the SW1 characteristic. As described above, the IIS is not performed before the imaging period, and thus the SW1 characteristic is a characteristic for correcting the image shakes caused by the lens shakes detected by the lens gyro sensor 110, only through the OIS. However, from the viewpoint of easy framing and the like, it has a characteristic of avoiding overcorrections of low-frequency image blurs.

Next, in the step S306, the camera MPU 102 waits until the user fully presses the release button, and when it is fully pressed, the flow proceeds to the step S307 to notify the lens MPU 109 of SW2-1ON. The lens MPU 109 having received SW2-1ON in the step S308 temporarily holds the OIS at the position of the image stabilizing lens 113 at that time.

Next, in the step S309, the camera MPU 102 calculates the movable stroke amount from the current position of the image sensor 104 in the IIS and notifies the lens MPU 109 of this amount. If the current position of the image sensor 104 shifts from the center position in its movable range, the lens MPU 109 is notified of a different value as the movable stroke amount for each moving direction of the image sensor 104.

Next, in the step S310, the lens MPU 109 calculates the IIS and OIS correction ratios for each moving direction based on the movable stroke amount of the image sensor 104 in the IIS and the movable stroke amount of the image stabilizing lens 113 at the current position in the OIS.

Next, in the step S311, the lens MPU 109 notifies the camera MPU 102 of the calculated IIS correction ratio. Then, in the step S312, the camera MPU 102 sets the IIS correction ratio received from the lens MPU 109 as a driving parameter of the image sensor 104 during the imaging period.

Next, in the step S313, the camera MPU 102 notifies the lens MPU 109 of SW2-2ON, which is an actual start notice of exposure (imaging). Then, in the step S314, the lens MPU 109 that has received SW2-2ON changes the OIS characteristic from the SW1 characteristic to the SW2 characteristic having a high low-frequency image stabilizing performance.

Next, in the step S315, the camera MPU 102 starts the IIS for the camera shakes with the set IIS correction ratio. At the same time, in the step S316, the lens MPU 109 starts the OIS for lens shakes with the set OIS correction ratio. Thus, during the imaging period, the camera MPU 102 controls the IIS simultaneous with the OIS control.

Next, in the step S317, the camera MPU 102 determines whether or not a predetermined exposure time has elapsed (or the imaging period has ended). The camera MPU 102 continues the IIS if the exposure time has not yet elapsed. On the other hand, when the exposure time has elapsed, the lens MPU 109 is notified of SW (release of SW2-2ON) in the step S318. Upon receiving SW1ON, the lens MPU 109 returns the OIS characteristic to the SW1 characteristic in the step S319. As described above, the SW1 characteristic is a characteristic that avoids overcorrections of the low-frequency image blurs, and inevitably the image stabilizing lens 113 is likely to move toward the center position.

Next, in the step S320, the camera MPU 102 determines whether or not the user has continuously fully pressed the release button (SW2-1ON) or whether or not continuous imaging has been instructed. Unless the continuous imaging is instructed, the image sensor 104 is returned to the center position (centered) in the step S321. When the camera MPU 102 confirms that the centering of the image sensor 104 is completed in the step S322, the flow returns to the step S306 and wants for the next imaging. Thus, the camera MPU 102 performs a first image stabilization control that moves the image sensor 104 to the center position after the previous imaging period (first imaging period) ends when a single image is captured, and starts with the center position for the IIS during the next imaging period (second imaging period). In this standby state, the lens MPU 109 performs calculation processing to calculate the OIS correction ratio and the IIS correction ratio in the next imaging in accordance with the movable stroke amount for each moving direction from the center position of the image sensor 104, and notifies the camera MPU 102 of the IIS correction ratio.

On the other hand, if continuous imaging is instructed in the step S320, the camera MPU 102 temporarily holds the image sensor 104 at the current position (the position at the end of the imaging period) in the step S323. Then, the flow returns to the step S306 to enter the standby state until the next imaging. In this way, the camera MPU 102 performs the second image stabilization control that starts the IIS during the next imaging period from the position where the imaging element 104 is held at the center position without being centered after the previous imaging period ends during the continuous imaging. In other words, the camera MPU 102 selects and performs one of the first image stabilization control and the second image stabilization control depending on whether it is single imaging or continuous imaging.

When processing subsequent to the step S307 is repeated for the next imaging in the continuous imaging, the camera MPU 102 in the step S309 calculates the movable stroke amount for each moving direction of the imaging element 104 from the position where the imaging element 104 is held in the step S323, and informs the lens MPU 109 of the calculated movable stroke amount. The lens MPU 109 performs calculation processing for calculating the OIS correction ratio and the IIS correction ratio in the next imaging in accordance with the received movable stroke amount of the image sensor 104, and notifies the camera MPU 102 of the IIS correction ratio.

Thus, the optimum OIS and IIS correction ratios can be set for each exposure by updating the movable stroke amount of the image sensor 104 between the continuously image captures, and an increase in the time interval between image captures (or a decrease in continuous imaging speed) can be prevented can be prevented without centering the image sensor 104 after each exposure ends.

This embodiment can provide a good image stabilizing performance even in the continuous imaging with a short time interval between image captures.

While this embodiment performs only the OIS before imaging, and performs both the IIS and the OIS during the imaging period, only the IIS may be performed before imaging. This embodiment determines the continuous imaging instruction from the user based on determining whether the release button is continuously fully pressed, but may determine that the continuous imaging is instructed when the continuous imaging mode is selected if one of the single imaging mode and the continuous imaging mode is selectable in the camera body 100.

Second Embodiment

Figure 4:
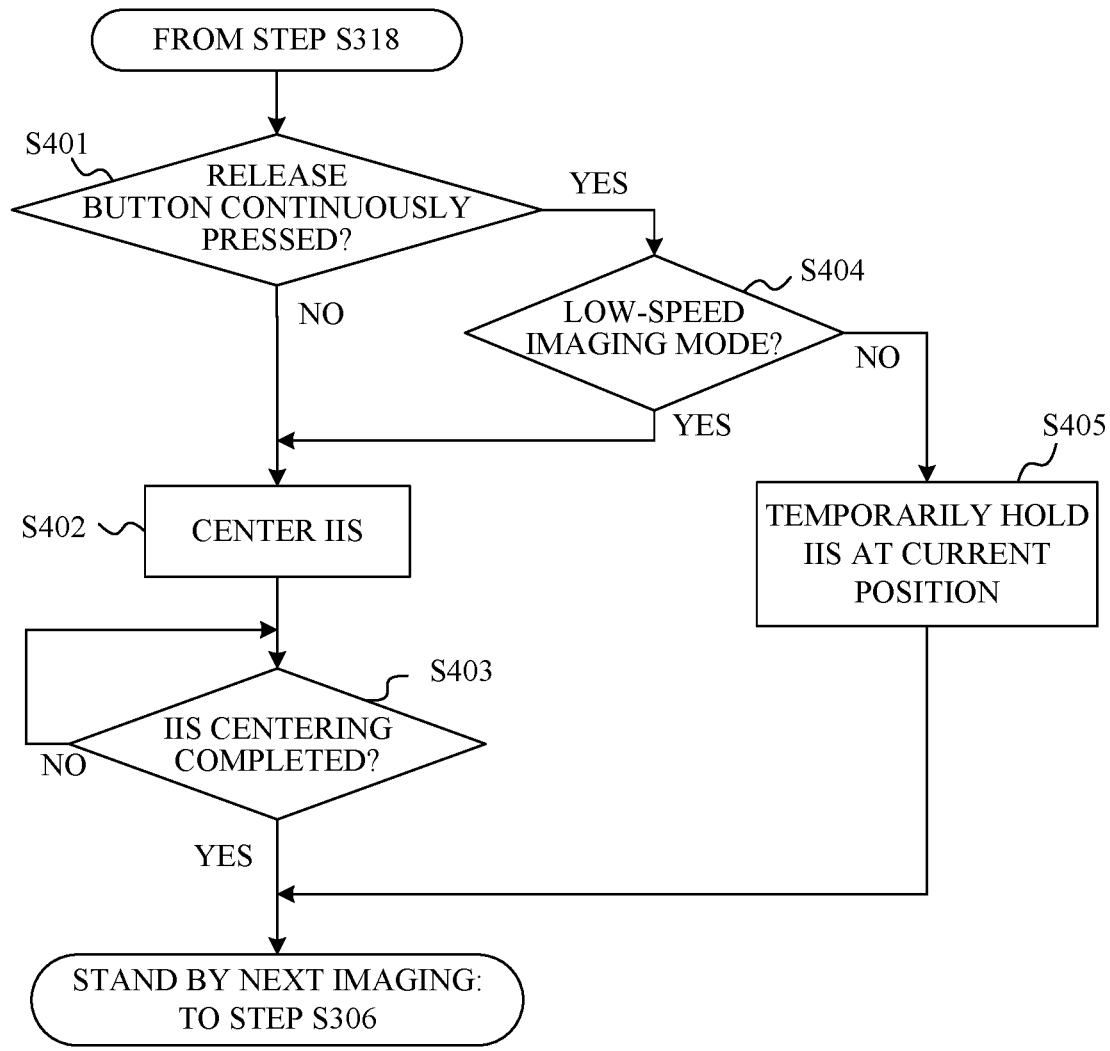
FIG. 4 is a flowchart showing image stabilizing processing according to a second embodiment of the present invention.

A flowchart in FIG. 4 shows processing after the step S318 in FIG. 3B in the image stabilizing processing executed by the camera MPU 102 in accordance with the computer program in a second embodiment of the present invention.

In the step S401 after the step S318, the camera MPU 102 determines whether or not the user has continuously fully pressed the release button (SW2-1 ON) or whether or not the continuous imaging has been instructed. If the continuous imaging is not instructed, the flow proceeds to the step S402 to center the image sensor 104. When the camera MPU 102 confirms that centering of the image sensor 104 is completed in the step S403, the flow returns to the step S306 in FIG. 3A and waits for the next imaging.

On the other hand, when the continuous imaging is instructed in the step S401, the camera MPU 102 determines in the step S404 whether the low-speed imaging mode or the high-speed imaging mode is set as the continuous imaging mode. The low-speed imaging mode is a mode in which the time interval between image captures (continuous imaging speed) is slower than that in the high-speed imaging mode. When the low-speed imaging mode is set, the continuous imaging speed is less likely to decrease even if the image sensor 104 is centered. Therefore, the camera MPU 102 proceeds to the step S402 and centers the image sensor 104.

If the high-speed imaging mode is set, the camera MPU 102 proceeds to the step S405 to temporarily hold the image sensor 104 at the current position to prevent the continuous imaging speed from decreasing, and proceeds to the step S306.

This embodiment can provide a good image stabilizing performance even when the high-speed imaging mode is set during the continuous imaging.

This embodiment has described an example in which the image sensor 104 is centered before the next imaging when the low-speed image capture mode is set, but the image sensor 104 may be centered in other cases. For example, when the current position of the image sensor 104 is significantly deviated from the center position, uneven exposure may occur in view of the shutter speed. Therefore, the image sensor 104 may be centered before the next imaging.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide a good image stabilizing performance even with a short time interval between the image captures when imaging is continuously repeated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-183749, filed on Oct. 4, 2019, which is hereby incorporated by reference herein in its entirety.

What is claimed is:

1. An image pickup apparatus comprising:
   an image sensor configured to capture an object image formed by an imaging optical system;
   a mover configured to move the image sensor for an image stabilization; and
   a controller configured to control the mover,
   wherein the controller controls the mover so as to move, when an optical element in the imaging optical system moves, the image sensor for the image stabilization in each of a first imaging period and a next second imaging period; and
   wherein the controller selects and performs one of a first image stabilization control and a second image stabilization control after the first imaging period ends, the first image stabilization control controlling the mover so as to return the image sensor to a predetermined initial position and to move the image sensor from the predetermined initial position during the second imaging period, and the second image stabilization control controlling the mover so as to hold the image sensor at a position at an end of the first imaging period and to move the image sensor from the position during the second imaging period.

2. The image pickup apparatus according to claim 1, wherein in performing the first image stabilization control, the controller waits for a calculation for moving the image sensor in the second imaging period with the image sensor returned to the initial position, and
   wherein in performing the second image stabilization control, the controller waits for the calculation with the image sensor held at the position at the end.

3. The image pickup apparatus according to claim 1, wherein the controller selects one of the first image stabilization control and the second image stabilization control in accordance with a time interval from an end of the first imaging period to the second imaging period.

4. The image pickup apparatus according to claim 1, wherein the controller performs the first image stabilization control in capturing a single image, and the second image stabilization control in continuously capturing images.

5. The image pickup apparatus according to claim 1, wherein the controller selects one of the first image stabilization control and the second image stabilization control in accordance with the position of the image sensor at the end of the first imaging period.

6. The image pickup apparatus according to claim 1, wherein the controller does not move the image sensor before each of the first and second imaging periods.

7. A control method of an image pickup apparatus configured to move an image sensor configured to capture an object image formed by an imaging optical system for an image stabilization, the control method comprising steps of:
  moving, when an optical element in the imaging optical system moves, the image sensor for the image stabilization in each of a first imaging period and a next second imaging period; and
  selecting and performing one of a first image stabilization control and a second image stabilization control after the first imaging period ends, the first image stabilization control returning the image sensor to a predetermined initial position and moving the image sensor from the predetermined initial position during the second imaging period, and the second image stabilization control holding the image sensor at a position at an end of the first imaging period and moving the image sensor from the position during the second imaging period.

8. A non-transitory computer-readable storage medium storing a computer program that causes a computer in an image pickup apparatus configured to move an image sensor that captures an object image formed by an imaging optical system for an image stabilization, to execute a control method,
  wherein the control method includes the steps of:
  moving, when an optical element in the imaging optical system moves, the image sensor for the image stabilization in each of a first imaging period and a next second imaging period; and
  selecting and performing one of a first image stabilization control and a second image stabilization control after the first imaging period ends, the first image stabilization control returning the image sensor to a predetermined initial position and moving the image sensor from the predetermined initial position during the second imaging period, and the second image stabilization control holding the image sensor at a position at an end of the first imaging period and moving the image sensor from the position during the second imaging period.

* * * * *